United States Patent
Sengamedu et al.

(10) Patent No.: US 9,280,528 B2
(45) Date of Patent: Mar. 8, 2016

(54) METHOD AND SYSTEM FOR PROCESSING AND LEARNING RULES FOR EXTRACTING INFORMATION FROM INCOMING WEB PAGES

(75) Inventors: Srinivasan Hanumantha Rao Sengamedu, Bangalore (IN); Charu Tiwari, Bhopal (IN); Amit Madaan, Kanpur (IN); Rupesh Rasiklal Mehta, Solapur (IN); S R Jeyashankher, Bangalore (IN); Rajeev Rastogi, Bangalore (IN)

(73) Assignee: Yahoo! Inc., Sunnyvale, CA (US)

(*) Notice: Subject to any disclaimer, the term of this patent is extended or adjusted under 35 U.S.C. 154(b) by 1015 days.

(21) Appl. No.: 12/896,942

(22) Filed: Oct. 4, 2010

(65) Prior Publication Data
US 2012/0084636 A1   Apr. 5, 2012

(51) Int. Cl.
G06F 17/00   (2006.01)
G06F 17/22   (2006.01)
G06F 17/30   (2006.01)

(52) U.S. Cl.
CPC ........ *G06F 17/2282* (2013.01); *G06F 17/2247* (2013.01); *G06F 17/30864* (2013.01); *G06F 17/30911* (2013.01)

(58) Field of Classification Search
CPC ............ G06F 17/2247; G06F 17/2282; G06F 17/30911
USPC ........... 715/200, 234, 272, 273, 255; 707/754
See application file for complete search history.

(56) References Cited

U.S. PATENT DOCUMENTS

| | | | | |
|---|---|---|---|---|
| 5,826,258 A | * | 10/1998 | Gupta et al. | 1/1 |
| 5,913,214 A | * | 6/1999 | Madnick et al. | 1/1 |
| 6,516,308 B1 | * | 2/2003 | Cohen | 706/12 |
| 6,606,625 B1 | * | 8/2003 | Muslea et al. | 1/1 |
| 6,782,505 B1 | * | 8/2004 | Miranker et al. | 715/203 |
| 7,660,804 B2 | * | 2/2010 | Wen et al. | 707/999.1 |
| 7,669,119 B1 | * | 2/2010 | Orelind et al. | 715/234 |
| 2005/0022115 A1 | * | 1/2005 | Baumgartner et al. | 715/513 |
| 2006/0282758 A1 | * | 12/2006 | Simons et al. | 715/500 |
| 2007/0208769 A1 | * | 9/2007 | Boehm et al. | 707/102 |
| 2008/0046441 A1 | * | 2/2008 | Wen et al. | 707/100 |
| 2008/0115057 A1 | * | 5/2008 | Grandhi et al. | 715/272 |
| 2009/0125529 A1 | * | 5/2009 | Vydiswaran et al. | 707/100 |
| 2010/0162097 A1 | * | 6/2010 | Dalvi et al. | 715/234 |
| 2010/0185684 A1 | * | 7/2010 | Madaan et al. | 707/803 |
| 2010/0257440 A1 | * | 10/2010 | Kshirsagar et al. | 715/230 |
| 2011/0040770 A1 | * | 2/2011 | Madaan et al. | 707/754 |

OTHER PUBLICATIONS

Gasparini et al, "Intensional Query Answering to XQuery expressions" 2005, p. 545-553.*

* cited by examiner

*Primary Examiner* — Cesar Paula
*Assistant Examiner* — David Faber
(74) *Attorney, Agent, or Firm* — Brinks Gilson & Lione

(57) ABSTRACT

An example of a method includes determining features of a first type for a web page of a plurality of web pages. The method also includes electronically determining a plurality of rules for an attribute of the first web page, wherein the plurality of rules are determined based on features of the first type. The method also includes electronically identifying a first rule, from the plurality of rules, which satisfies a first predefined criterion. The first predefined criteria include at least one of a first threshold for a precision parameter, a second threshold for a support parameter, a third threshold for a distance parameter and a fourth threshold for a recall parameter. The method further includes storing the first rule to enable extraction of value of the attribute from a second web page.

20 Claims, 11 Drawing Sheets

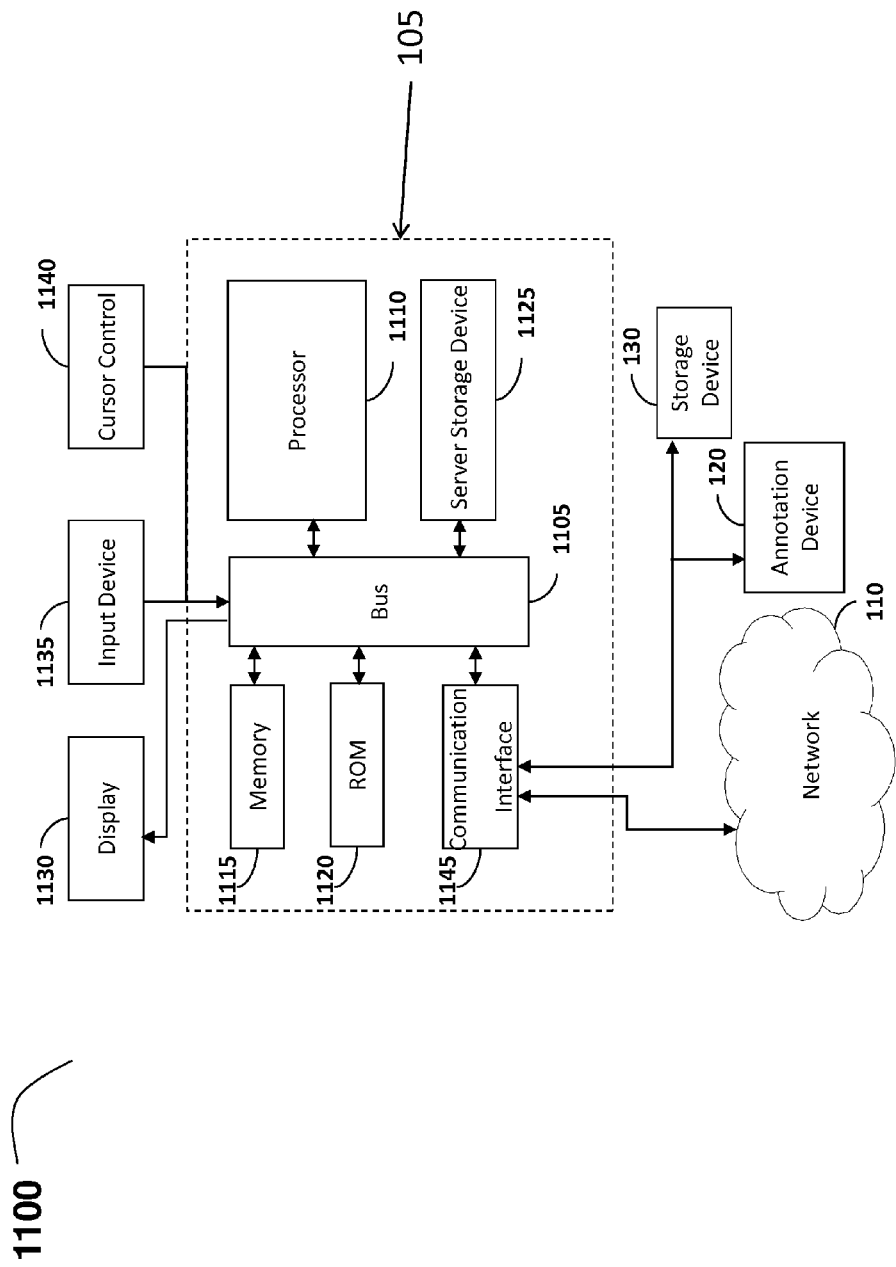

METHOD AND SYSTEM FOR PROCESSING AND LEARNING RULES FOR EXTRACTING INFORMATION FROM INCOMING WEB PAGES

BACKGROUND

Over a period of time, web content has increased many folds. The web content is present in various formats, for example hypertext mark-up language (HTML) format. Finding and locating desired content in a time efficient manner is still a challenge. Further, there is also an unmet need of extracting the desired content with accuracy.

SUMMARY

An example of a method includes determining features of a first type for a web page of a plurality of web pages. The method also includes electronically determining a plurality of rules for an attribute of the first web page, wherein the plurality of rules are determined based on features of the first type. The method also includes electronically identifying a first rule, from the plurality of rules, which satisfies a first predefined criterion. The first predefined criteria include at least one of a first threshold for a precision parameter, a second threshold for a support parameter, a third threshold for a distance parameter and a fourth threshold for a recall parameter. The method further includes storing the first rule to enable extraction of value of the attribute from a second web page.

An example of an article of manufacture includes a machine readable medium and instructions carried by the machine readable medium and operable to cause a programmable processor to perform determining features of a first type for a first web page of a plurality of web pages. The article of manufacture also includes instructions carried by the machine readable medium and operable to cause the programmable processor to perform determining a plurality of rules for an attribute of the first web page, wherein the plurality of rules are determined based on features of the first type. The article of manufacture also includes instructions carried by the machine readable medium and operable to cause the programmable processor to perform identifying a first rule, from the plurality of rules, which satisfies first predefined criteria. The first predefined criteria include at least one of a first threshold for a precision parameter, a second threshold for a support parameter, a third threshold for a distance parameter and a fourth threshold for a recall parameter. The article of manufacture further includes instructions carried by the machine readable medium and operable to cause the programmable processor to perform storing the first rule to enable extraction of value of the attribute from a second web page.

An example of a system includes a communication interface in electronic communication with one or more web servers comprising multiple web pages, a memory that stores instructions and a processor responsive to the instructions to determine features of a first type for a first web page of a plurality of web pages. The processor also determines a plurality of rules for an attribute of the first web page, wherein the plurality of rules are determined based on features of the first type. The processor is further responsive to the instructions to identify a first rule, from the plurality of rules, which satisfies a first predefined criteria including one of a first threshold for a precision parameter, a second threshold for a support parameter, a third threshold for a distance parameter and a fourth threshold for a recall parameter. The processor is further responsive to the instructions to store the first rule to enable extraction of value of the attribute from a second web page.

BRIEF DESCRIPTION OF THE FIGURES

FIG. 11 is a block diagram of a server, in accordance with one embodiment.

DETAILED DESCRIPTION OF THE EMBODIMENTS

Figure 1:
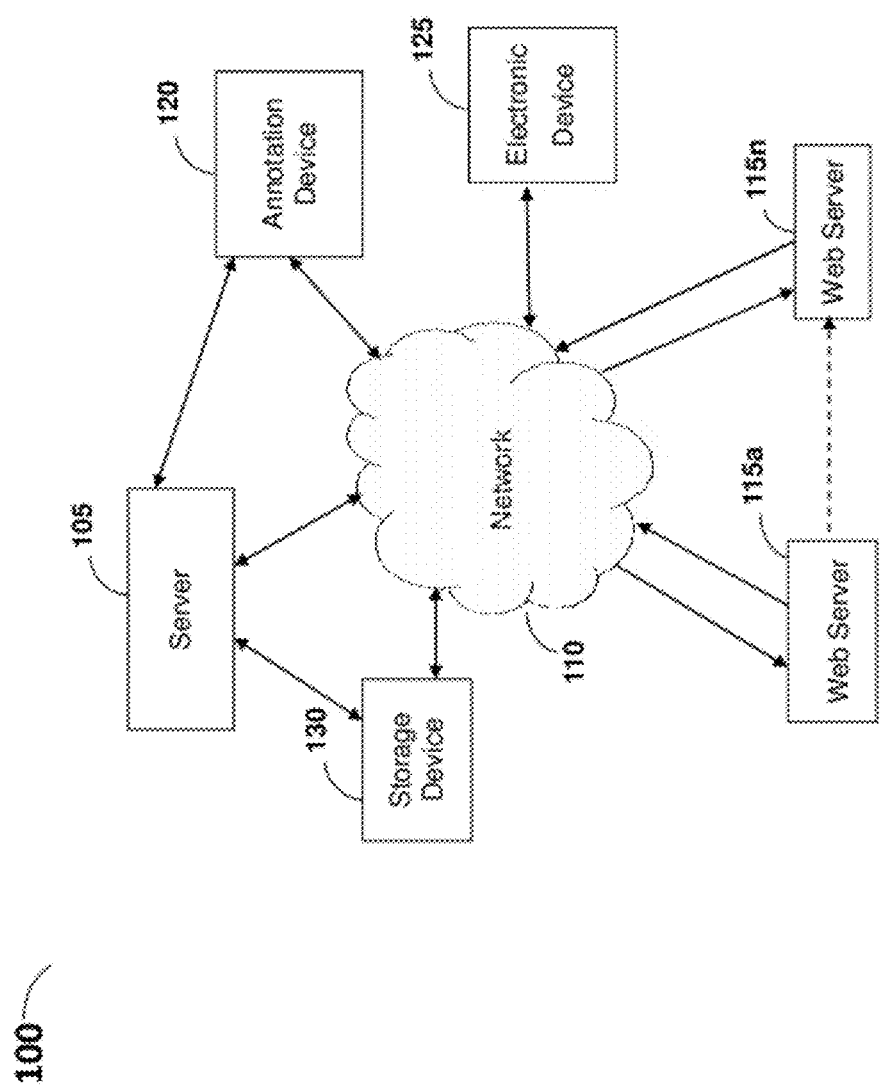
FIG. 1 is a block diagram of an environment, in accordance with which various embodiments can be implemented.

FIG. 1 is a block diagram of an environment 100, in accordance with which various embodiments can be implemented. The environment 100 includes a server 105 connected to a network 110. The server 105 is in electronic communication with one or more web servers, for example a web server 115*a* and a web server 115*n*. The web servers can be located remotely with respect to the server 105. Each web server can host one or more websites on the network 110. Each website can have multiple web pages. Examples of the network 110 include, but are not limited to, a Local Area Network (LAN), a Wireless Local Area Network (WLAN), a Wide Area Network (WAN), internet, and a Small Area Network (SAN).

The server 105 is also connected to an annotation device 120 and an electronic device 125 of a user directly or via the network 110. The annotation device 120 and the electronic device 125 can be remotely located with respect to the server 105. Examples of the annotation device 120 include, but are not limited to, computers, laptops, mobile devices, hand held devices, telecommunication devices and personal digital assistants (PDAs). Examples of the electronic device 125 include, but are not limited to, computers, laptops, mobile devices, hand held devices, telecommunication devices and personal digital assistants (PDAs). The annotation device 120 is used for annotating an entity on a web page. For example, a label "LCD TV 32 inch" on the web page can be annotated as TITLE and can be referred as an annotated entity. The annotation of the nodes can be automated or performed manually by an editor. The annotated nodes can then be stored and accessed by the server 105.

In some embodiments, the server 105 can perform functions of the annotation device 120.

The server 105 has access to several web sites. Each web site can have multiple web pages. The web pages are structurally similar. The web pages can be annotated or unannotated. In one example, the server 105 has access to N web pages out of which K are annotated. The server 105 processes the web pages to learn rules for extracting values of attributes from incoming web pages. A phase in which the server 105 processes the web page for creation and learning of rules is called "learning phase". A phase in which the server 105 uses the rules to extract values of an attribute from multiple web pages is called as extraction phase. Rules are learnt for multiple attributes.

The server 105 is also connected to a storage device 130 directly or via the network 110 to store information, for example rules or values of the attributes.

In some embodiments, different storage devices are used for storing the rules and the values of the attributes. Also, the learning phase and the extraction phase can be performed using multiple servers.

The rules can be stored and can be used for extraction as and when desired. The values that are extracted can also be stored, and used as and when desired. For example, the values can be accessed by a search engine to enable search and provide relevant results to the user of the electronic device 125.

Figure 2:
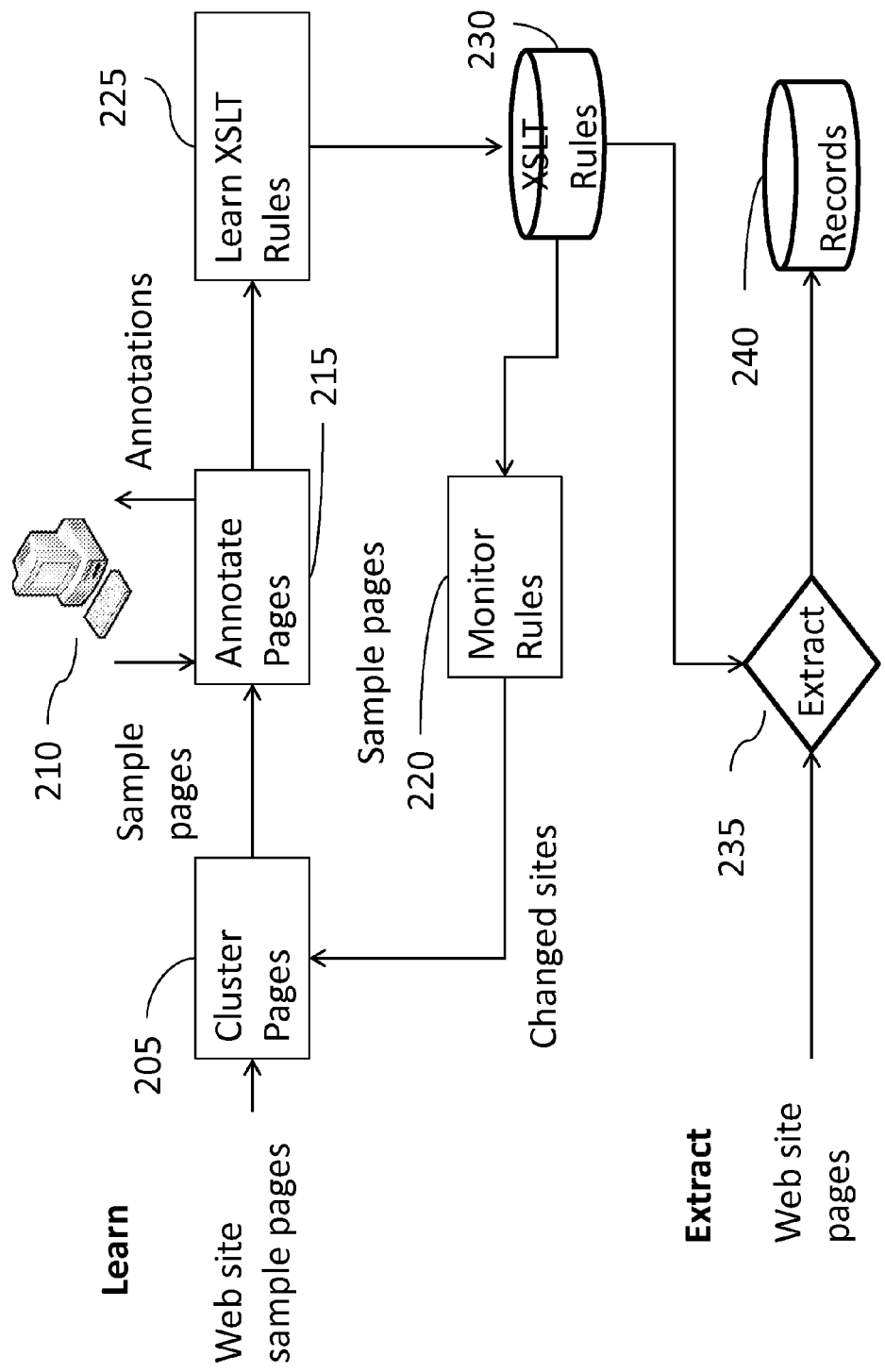
FIG. 2 is a block diagram illustrating flow of information for web extraction, in accordance with an embodiment.

The learning phase and the extraction phase are explained in detail in conjunction with FIG. 2.

FIG. 2 is a block diagram illustrating flow of information for web extraction.

A cluster 205 of web pages is received by the server 105. The cluster 205 is created by grouping similar structured web pages in a web site. The cluster 205 is then transmitted to an annotating entity 210 for annotation. Entities are then annotated in the web page and a node corresponding to annotated entity is referred to as an "annotated nodes". The page including annotated node is referred to as an annotated page.

Annotated pages 215 are then received by the server 105 and are used for learning rules (225), for example extensible stylesheet language transformation (XSLT) rules. The server 105 receives the annotated pages 215 and unannotated pages, and generates XPath rules to extract (235) exact values of attributes.

For generation of rules features of a first type (strong features) and features of a second type (weak features) are identified from a first web page of the web pages. The web page which is being processed is referred to as "the first web page". Features include HTML features, for example "class=price"; "width=10" and "Id=2". The features are then categorized as strong features and weak features.

The strong features include features that are not expected to change over time. For example, the strong features of the annotated page 215 include class or id values, tags, and textual features. The strong features include structural information of the first web page and textual information of the first web page.

The weak features are determined as features which can change frequently and are less robust in nature. For example, the weak features of the annotated page 215 include values of font, width and color.

The identification of features can be performed by determining scores for the features using various techniques. Based on the scores the features can be categorized as strong and weak. Example of one technique for determining the scores is described in a U.S. patent application Ser. No. 12/344,076 entitled, "ROBUST WRAPPERS FOR WEB EXTRACTION" having publication number US20100162097, filed on Dec. 22, 2008 and assigned to Yahoo! Inc. which is incorporated herein by reference in its entirety.

Several rules (225) are then identified for an attribute of the first web page. The attribute corresponds to the annotated node on the web page. Examples of the rules (225) include XPath expressions or robust XPath expressions. The generation of robust XPath expressions as rules can be performed, for example using the technique described in U.S. patent application Ser. No. 12/540,384 entitled "ROBUST XPATHS FOR WEB INFORMATION EXTRACTION" filed on Aug. 13, 2009 and assigned to Yahoo! Inc., which is incorporated herein by reference in its entirety.

A first rule that satisfies first predefined criteria is then identified from among the rules. The first predefined criteria are based on the strong features. If none of the rules satisfy the first predefined criteria then a second rule that satisfies second predefined criteria is identified. The second predefined criteria are based on the strong features. In addition to the second rule, an extraction criteria is also identified based on both strong and weak features.

If the first rule is identified then the first rule is stored as rule (230) for the attribute. If the second rule and the extraction criteria are identified then they are stored as the rule (230).

Identification and storage of the rule (230) is performed for each attribute of each web page having annotation.

A second web page is then received and the rule (230) for the attribute is extracted. The rule (230) is applied on the second web page to extract value of the attribute. Extraction of value of each attribute on the second web page is performed using corresponding rule. Extracted values are then stored as records (240).

In some embodiments, in order to identify rule breakages rule monitoring (220) is performed. The rule monitoring helps in determining changed web sites.

Figure 3:
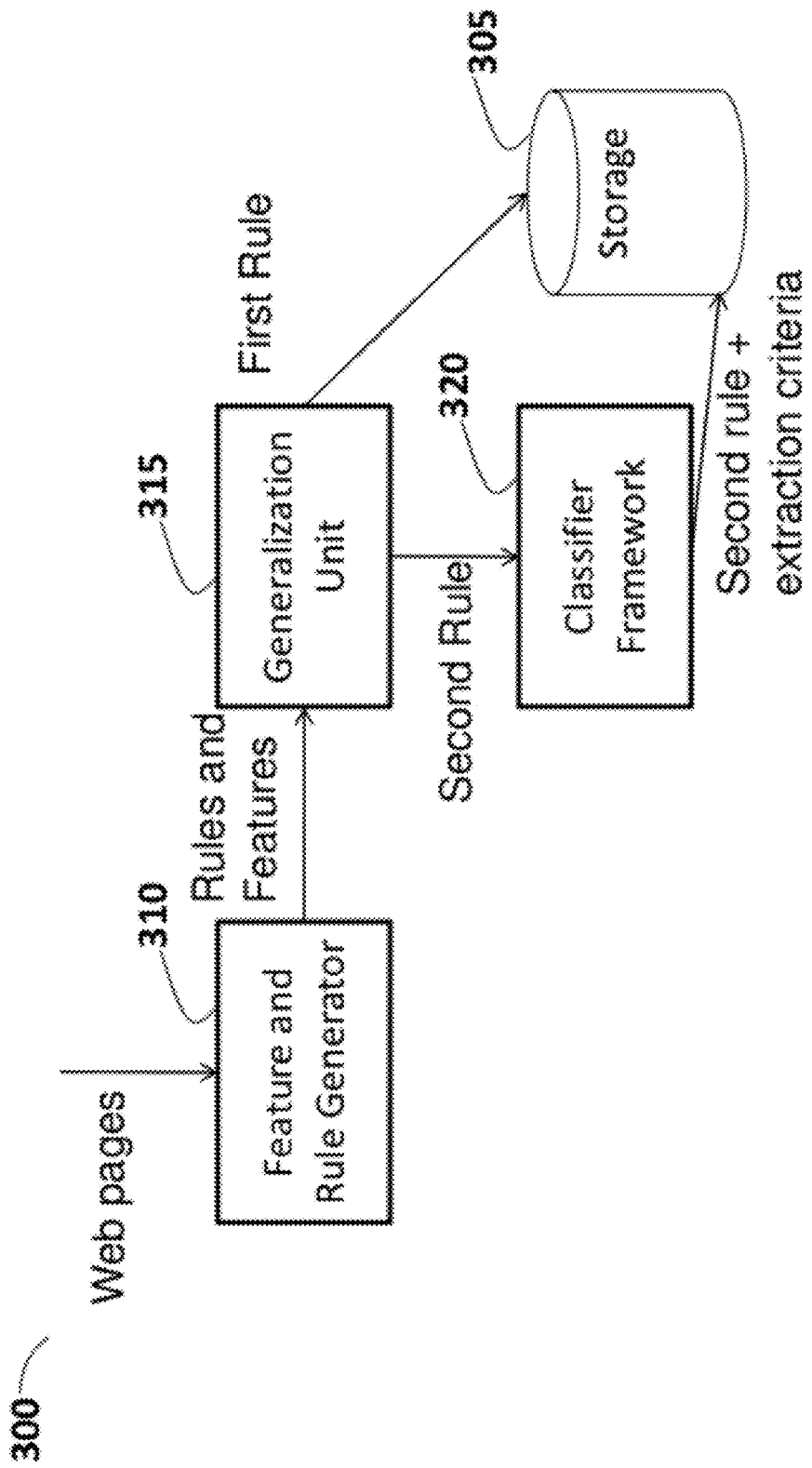
FIG. 3 is a block diagram of a system for identification of rules, in accordance with an embodiment.

FIG. 3 is a block diagram of a system 300 for identification of rules. The system 300 illustrates portion of the server involved in the learning phase.

The system 300 receives the web pages. In one example, the web pages include K annotated web pages and (N-K) unannotated web pages. The web pages correspond to one web site and are structurally similar.

Feature and Rule Generator 310 for Feature Generation and Rules Determination

A feature and rule generator 310 processes web pages one by one and generates the features. In one example, features for the first web page are generated. The features are then categorized as strong features (features of first type) and weak features (features of second type). The strong features include features that are not expected to change over time.

The weak features are determined as features which can change frequently and are less robust in nature as compared to the strong features.

Rules are then generated using the strong features. The rules are generated for each attribute corresponding to an annotated node of a first web page. The rules are generated for all attributes corresponding to annotated nodes one by one. For purpose of explanation one attribute is considered.

The strong features include structural information associated with the attribute and textual information associated with the attribute. The structural information includes information related to structure of a tree structure of the web page. The structural information also includes neighborhood information of the annotated node. Textual information includes actual text of the annotated node. In some embodiments, the textual information includes actual text of the annotated mode and that of the neighboring nodes.

One exemplary way of generating features and rules for the attribute by the feature and rule generator 310 is now explained.

The set of strong features is generated from an annotated page=P, with an annotated node=a, corresponding to the attribute and is denoted as F (a, P)={(T, L, V)}, where T is the type of feature, L is the level or distance of a node X (also referred to as a query) from the annotated node, and V is the value for the type.

The type of features includes TAGS, ID AND CLASS, PRECEDING AND FOLLOWING SIBLING PREDICATES, and TEXT PREDICATES.

Tags

For each node 'n' from the annotated node to the root a ("tag", L, t) is added as a feature, where L is the distance of the node 'n' from the annotated node and 't.' is the tag name of the node 'n'. The distance is 0 when the node 'n' is the annotated node. The XPath corresponding to this feature is //t/*/ . . . /*/node( ). The number of * in the XPath indicates the distance 'L'.

ID and Class

For each node n, in the path from the annotated node to the root, if 'n' has an ID feature then two features ("id", L, V) and ("id", L, *) are generated. Here, the ID feature can be an HTML "id" attribute. The XPaths corresponding to ID feature are //*[@id=V]/*/ . . . /*/node ( ) or //*[@id]/*/ . . . /*/node ( ), wherein V is the value of the ID feature.

Similarly the XPaths for CLASS feature are //*[@class=V]/*/ . . . /*/node ( ) or //*[@class]/*/ . . . /*/node( ) wherein V is the value of the CLASS feature.

Preceding and Following Sibling Predicates

For each preceding sibling, for example ith preceding sibling, of the annotated node, feature ("preceding-sibling-tag-i", L, t) is added, wherein 't.' is the tag of the ith preceding sibling.

If the preceding sibling has an ID feature, ("preceding-sibling-id-i", 1, "*") and ("preceding-sibling-id-i", L, V) are added. Similar features are added if the preceding sibling has a CLASS feature.

The XPath for PRECEDING SIBLING feature is //*[preceding-sibling::*[position( )=i][self::t]]/*/ . . . /*/node( ) or //*[preceding-sibling::*[position( )=i][@idγV]]/*/ . . . /*/node( ).

Similarly, the XPath for the FOLLOWING PREDICATE feature is generated as //*[following-sibling::*[position ( )=i=][self::t]]/*/ . . . /*/node( ) or //*[following-sibling::*[position( )=i][@id=V]]/*/ . . . /*/node( ).

Text Predicates

First occurrence of non-empty text to the left of the node 'n' and to the right of the node 'n' is determined. The text is called anchor text. The text can occur within the annotated node that contains the target text or outside. For example, in a fragment <span>Our Price: $25.99</span>let $25.99 be the annotated text. Our Price is first non-empty text that is also within the annotated node under <span>. When the non-empty text to the left or right of the annotated text is within the annotated node then such text is called inside anchor texts.

When the non-empty text to the left or right of the annotated text is outside the annotated node then such text is called outside anchor texts. For example, in a fragment <span>Our Price:</span><span>$25.99 </span>let $25.99 be the annotated text. Our Price is first non-empty text that is outside the annotated node under <span>.

The following features for the left anchor text are added. If left anchor is an inside anchor, add ("inside-left-word", 0, w) and ("inside-left-text", 0, t), wherein 'w' is the first word to the left of the annotated text and 't.' is the text from beginning of the node 'n' to the annotated text. The resulting XPath is //*[contains(text( ), w)] for the word and //*[starts-with(, t)] for the text.

If left text anchor is not an inside anchor, add ("out-left-word", 0,w) and ("out-left-text", 0, t). The resulting XPath is //*[preceding::text( ) normalize-space(.) !=" "][position ( )=last( )][.="t"] for full node match and //*[preceding::text ( )[normalize-space(.) !=" "][position( )=last( )][ends-with(., "w")] for the left node.

Similar features are also generated for the right anchor text.

After the features are generated disjunction of features can also be performed.

Disjunction of Features

Disjunctions of feature values that have the same type and are at equal distance from the annotated nodes are added.

For example, if the text on the right of the annotated attribute across two annotations is "review" and "reviews" respectively, then an additional feature that has a disjunctive value "review" or "reviews" is added. The corresponding XPath fragment is //*[ends-with(text( ), "review") or ends-with(text( ), "reviews")].

Rules Determination from Features

Each feature has a corresponding XPath expression that selects the annotated nodes, and possibly other nodes. For example, if ("tag", 3,div) is a feature, //div/*/*/node( ) is the corresponding XPath expression for the feature.

All rules for the attribute are then fed to the generalization unit 315 from the feature and rule generator 310.

Generalization Unit 315

The generalization unit 315 starts with level one feature. The rules corresponding to the level one feature are considered and checked against the first predefined criteria. The level one feature corresponds to any of the feature mentioned above. The first predefined criteria include a first threshold for a precision parameter, a second threshold for a support parameter, a third threshold for a distance parameter, and a fourth threshold for a recall parameter. The aim of the first predefined criteria is to determine a rule that when applied to annotated pages selects only the annotated nodes and none of the other nodes on annotated pages.

Once the check is performed for rules corresponding to the level one feature the check is performed for rules corresponding to level two features. The level two features correspond to combination of two features from among the features mentioned above. Similar procedure is followed for level three features and so on until an XPath expression satisfying the first predefined criteria is determined. For example, if ("tag", 3,div), ("preceding-sibling-class-2", 3, c1 or c2) and ("id", 1, i1) are three features that are combined, combined XPath expression can be //div[preceding-sibling::node( )[position ( )=2][@class="c1" or @class="c2"]]/*/*[@id="i1"]/node ( ). Other possible combinations are also considered. For example, if there are two XPath expression X1 and X2 then possible combined XPaths can be X1 followed by X2, and X2 followed by X1. XPath expressions corresponding to the set of features F, are denoted as X(F).

The generalization unit 315 receives all features and corresponding rules, and determines the first rule. The check is performed by applying rules on set of N web pages, where K pages are annotated and (N−K) pages are unannotated.

The precision parameter prec(X) for an XPath X is defined as a ratio of the number of correct nodes selected by the XPath X to the total number of nodes selected by the rule.

The support parameter sup(X) is the support of an XPath X in unannotated pages. The sup(X) is the fraction of number of unannotated pages in which the XPath X selects one or more candidates to total number of unannotated pages.

The distance parameter dist(X) is a distance measure of the XPath X from the annotated nodes. dist(X) is defined to be the maximum distance of the features of the XPath X.

The recall parameter is the measure of selection of annotated nodes by the XPath X.

The generalization unit 315 determines the values of the parameters for level one feature and compares the values against respective thresholds. If any XPath corresponding to level one feature satisfies the first predefined criteria then that XPath is selected as the first rule else rules corresponding to level two features are considered.

In one example, the following first predefined criteria is considered:
1) The XPath selects all annotated nodes making value of the recall parameter as one and hence, satisfying the fourth parameter.
2) Among all XPaths satisfying the fourth parameter prec (X) for the XPath is maximum or is satisfying the first threshold
3) Among all XPaths satisfying the fourth threshold and the first threshold dist(X) for the XPath is minimum or is satisfying the third threshold
4) Among all XPaths satisfying the fourth threshold, the first threshold, and the third threshold sup(X) for the XPath is maximum or is satisfying the second threshold In one embodiment, any combination of the four parameters can be used. In another embodiment, a parameter can be used alone or in combination with other parameters.

The first predefined criteria can be checked using various techniques, for example an apriori algorithm described in publication entitled, "*FAST ALGORITHMS FOR MINING ASSOCIATION RULES*" by Rakesh Agrawal and Ramakrishnan Srikant, published in *Proceedings of the* 20*th International Conference on Very Large Data Bases*, Pages: 487-499, Year of Publication: 1994, ISBN:1-55860-153-8, which is incorporated herein by reference in its entirety.

An exemplary algorithm is also mentioned below:

```
C1 = {f, f ∈ S};
k=1; min_dist=∞ ; max_sup=0;max_prec=0;
while Ck=Ø do
    Lk+1=Ø
    For all XPath X(F), F in Ck do
        If X selects all the positive nodes in P+ then
            If X selects a negative node in P− or X matches more than one
            node in an unannotated page then
                L(k+1)=L(k+1) ∪ {F}
                If (prec(X)>max_prec) or
                (prec(X)=max_prec and dist(X)<min_dist) or
                (prec(X)=max_prec and dist(X)=min_dist and
                sup(X)>max_sup)
                then
                    max_prec=prec(X)
                    max_prec_XPath=X
                    min_dist=dist(X)
                    max_sup=sup(X)
                end if
            Else if(dist(X)<min_dist)or
            (dist(X)=min_dist and (sup(X)>max_sup))
            then
                best_XPath=X
                min_dist=dist(X)
                max_sup=sup(X)
                max_prec=1
            end if
        end if
    end for
    for all XPath X(F),F∈L(k+1) do
        if(dist(X)>min_dist)or
        (dist(X)=min_dist and sup(X)≤max_sup) then
            Delete X from L(k+1)
        End if
    End for
    C(k+1)=Generate L(k+1)
    k=k+1
end while
if best_XPath is not equal to NULL then
    return best_XPath
else
    return max_prec_XPath
end if
```

If the XPath (best XPath) satisfying the first predefined criteria is not identified after all possible combination of features then the classifier framework 320 is used else the XPath satisfying the first predefined criteria is determined as the first rule.

The generalization unit 315 then selects a second rule that satisfies second predefined criteria. The second predefined criteria include the fourth threshold for the recall parameter and a fifth threshold for the precision parameter. In one example, the XPath (second rule) with maximum precision and having value of recall parameter as one is selected. The second rule is then sent to the classifier framework 320.

Classifier Framework 320

Since the generalization unit 315 generates the second rule having value of the precision parameter as less than one the second rule is prone to generating some noisy nodes when used for extraction. Hence, a classification technique, for example Naïve-Bayes based classification technique is used to generate extraction criteria to be used along with the second rule.

Generation of Extraction Criteria by the Classifier Framework 320

The classifier framework 320 considers rules corresponding to the strong and weak features in addition to the second rule. The second rule is applied on the annotated web pages. And the annotated nodes selected by the second rule are determined as positive nodes and other nodes selected by the second rule are determined as negative nodes. Scores for the weak features are then determined based on the positive nodes and the negative nodes using Naïve-Bayes classifier. The weak features are evaluated relative to the set of nodes generated by the second rule. Hence, all features that have level one are translated to self XPath expressions; features with level two from the annotated nodes are translated to parent XPath expressions, and all features with level three or above are translated to ancestor XPath expressions. For instance, a feature ("class", 0, c1) is converted to an XPath expression on candidate nodes as self::*[@class="c1"], and a feature ("tag", 3,div) is converted to ancestor:: div.

The scores for the weak features are referred to as the extraction criteria.

In some embodiments, the first rule or the second rule is further refined by determining offset criteria and regular expression criteria. The offset criteria are also referred to as range pruner criteria. The first rule or the second rule is then said to be including the offset criteria and the regular expression criteria.

Determination of Offset Criteria

In one example, if the node corresponding to the attribute includes "Our Price: $25.99", then the complete text may not be relevant. In illustrated example, required output is "$25.99". Range pruner is a component that selects the text of interest from a node or a pair of nodes. It learns the required range information (in our example, third or last word) and extracts the text of interest from a given node.

In an embodiment, the range selection problem includes two aspects:

Partial-Node Selection:

When the text of interest is not the complete text of a leaf node, but only a part of it, the range pruner learns consistent word level range across annotated pages. This range information is captured in terms of a Start Offset (SO) and an End Offset (EO). Learning an offset is done either from the beginning or the end of the node text for both SO and EO. Offsets with respect to the end of the node text are indicated by negative numbers. Finally, the text that is consistent across all annotated examples is picked.

For example, if the text of interest for price attribute is "$25.99" from text "Our Price: $25.99" in page 1 and "$35.10" from text "Price: $35.10" in page 2 then the range information for the text of interest is varying from the beginning of the node text (i.e. 3rd word in page 1 and 2nd word in page 2), but consistent from the end of the node text (i.e. last word in both pages). So, the range pruner learns range information: SO=-1 and EO=-1, indicating the last word of node text as the text of interest.

Multi-Node Selection:

When the text of interest spans multiple nodes, the start node and the end node including the text of interest are identified and XSLT rule (with partial-node range information, if any) is learnt for both the nodes independently. The range pruner extracts the text between these two nodes only if both the nodes are identified with certain confidence and the start node occurs logically before the end node in the DOM tree. The range pruner first outputs the start node text (with partial-node selection, if required), the text between the start and the end node, and the end node text (again, with partial-node selection, if required).

Figure 10:
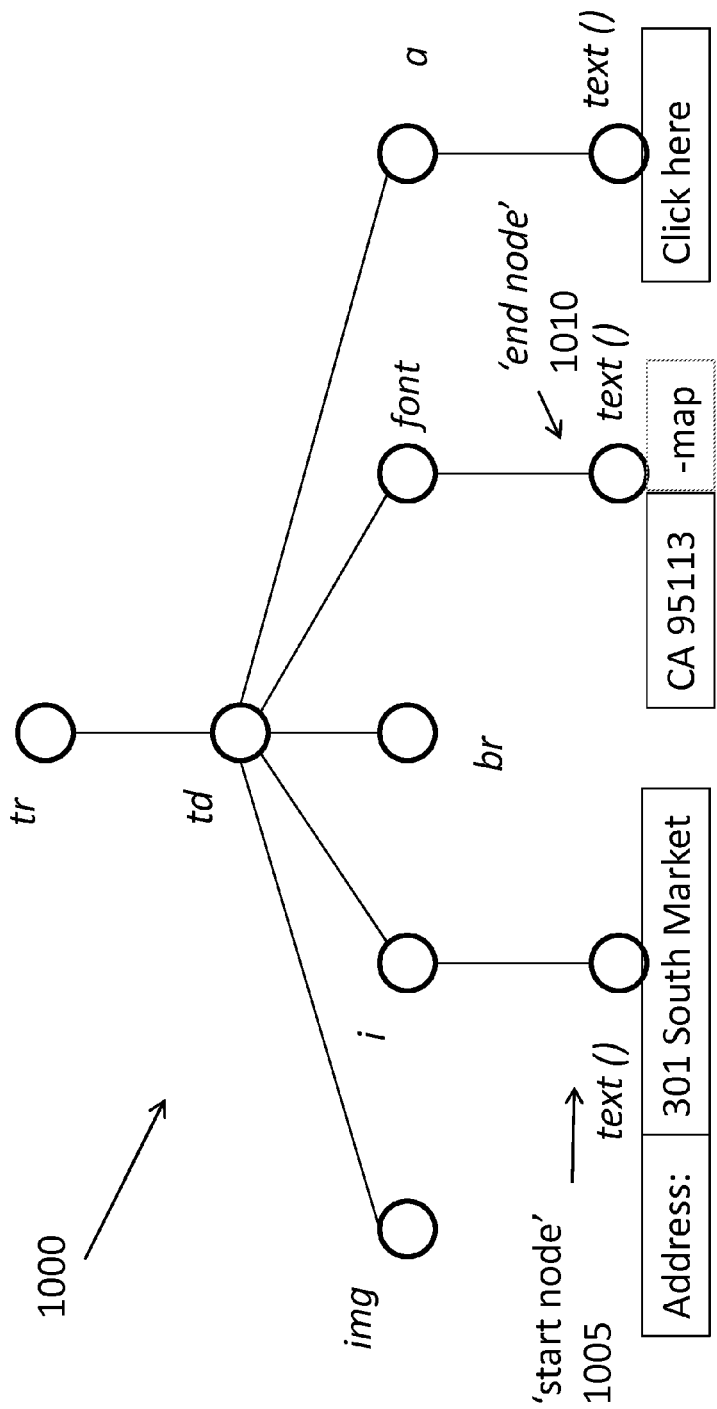
FIG. 10 is yet another exemplary illustration of generation of a rule for an attribute from a tree structure of a web page.

For example, in FIG. 10, the selected text of interest for "address" attribute span across nodes. The start node (td/i/textQ) and the end node (td/font/text( ) containing the selected text of interest are identified and the XSLT rule is learnt independently for both of them. The range pruner learns range information for the start node as: SO=2 and EO=4 and for the end node as: SO=1 and EO=2. The text of interest is extracted based on the start and the end node range learning and the text between them.

Determination of Regular Expression (Regex) Criteria

In addition to the offset criteria, regex criteria are also used for selecting values of "typed" attributes like price (currency+ number), phone number, zip code, etc. The regex criteria are created and are associated with the corresponding typed attributes. The regex criteria select and validate the attribute values in the presence of surrounding text.

The first rule or the second rule and extraction criteria are then stored in a storage device 305.

In some embodiments, when the value of the attribute spans along multiple nodes then the first rule or the second rule includes a plurality of XPath expressions. If the value of the attribute is in a single node then the first rule or the second rule includes one XPath expression.

Figure 4:
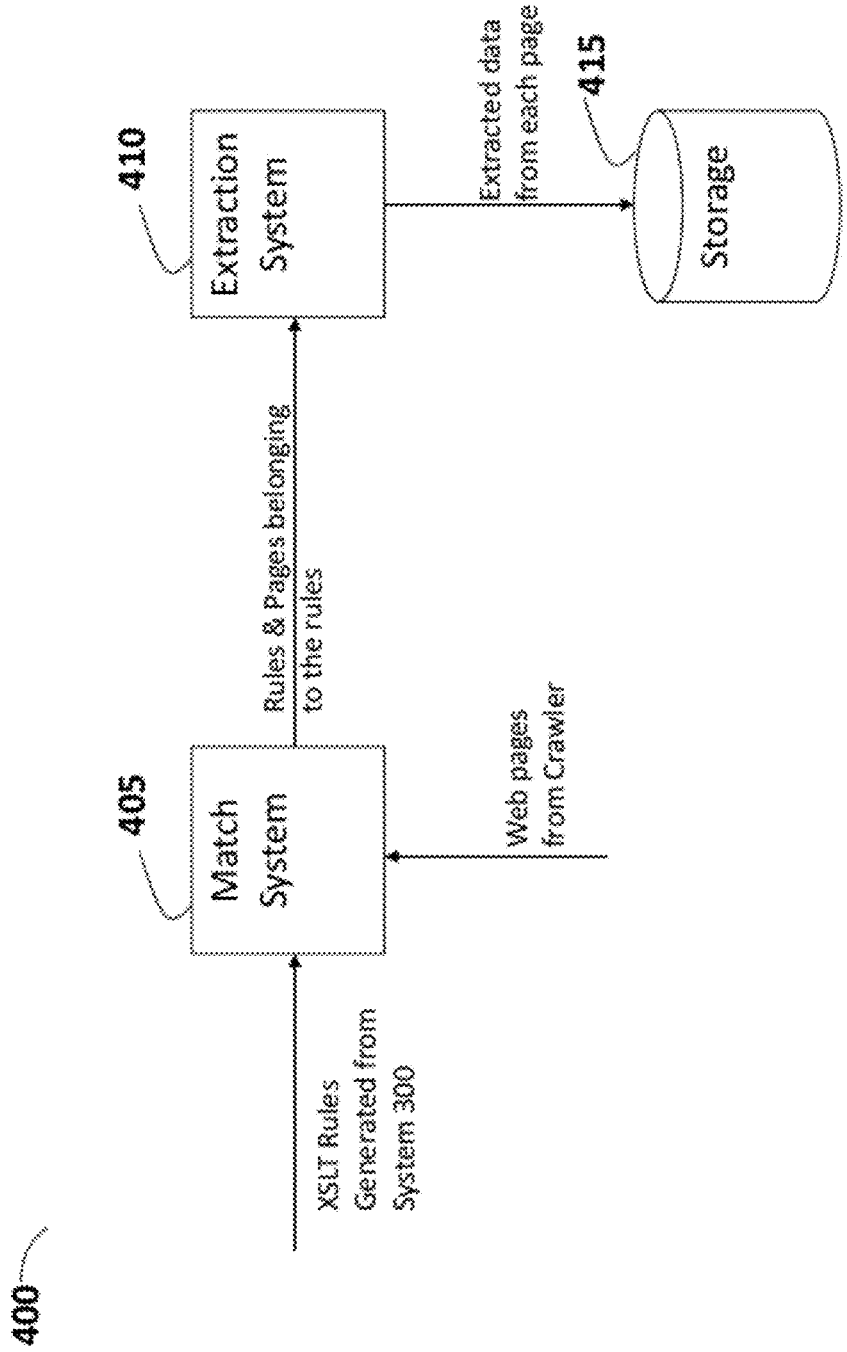
FIG. 4 is a block diagram of a system for extracting contents, in accordance with an embodiment.

FIG. 4 is a block diagram of a system 400 for extracting contents, in accordance with an embodiment. The system 400 is a portion of the server 105 involved in extraction of values of attributes.

A match system 405 receives a second web page and has access to the rules stored in the storage device 305.

The extraction of the data of interest from the second web page is done in two steps. The match system 405 determines the first rule or the second rule and extraction criteria whichever is present in the storage device 405 as matching rule for extraction of value of the attribute from the second web page. One rule corresponding to one attribute of the second page is identified. The matching is done based on shingle vector based matching technique.

In one example, a URL regex "http://domain-name/product/(.*)/detail.html" and size restrictions are associated with each rule. First the match system 405 filters the rules whose URL regex "http://domain-name/product/(.*)/detail.html" does not match the second web page and then the rules are narrowed down to match the shingle vector of the second web page.

Once the rule corresponding to the attribute is identified then an extraction system 410 extracts value of the attribute based on the rule. The rule can be either the first rule or the second rule and extraction criteria. The extraction of values is performed for various attributes and the values that are extracted are stored in a storage device 415. The stored values can then be used for various purposes, for example for providing search results.

FIG. 5A, FIG. 5B, and FIG. 5C are flowcharts illustrating a method 500 for web information extraction.

At step 505, the features of the first type (strong features) are determined for the first web page.

The identification of features can be performed, for example using the technique described in U.S. patent application Ser. No. 12/344,076 entitled, "ROBUST WRAPPERS FOR WEB EXTRACTION" having publication number US20100162097, filed on Dec. 22, 2008 and assigned to Yahoo! Inc. which is incorporated herein by reference in its entirety.

At step 510, a plurality of rules for an attribute of the first web page are determined based on the features of the first type.

In some embodiments, determining the rules include creating rules based on disjunction of the features of the first type.

Each rule includes either an XPath expression if value of the attribute is included in one node or a plurality of XPath expressions if the value of the attribute is included in multiple nodes.

At step 515, a check is performed to identify a first rule that satisfies the predefined criteria from the rules. The first predefined criteria include a first threshold for a precision parameter, a second threshold for a support parameter, a third threshold for a distance parameter and a fourth threshold for a recall parameter.

Figure 5:
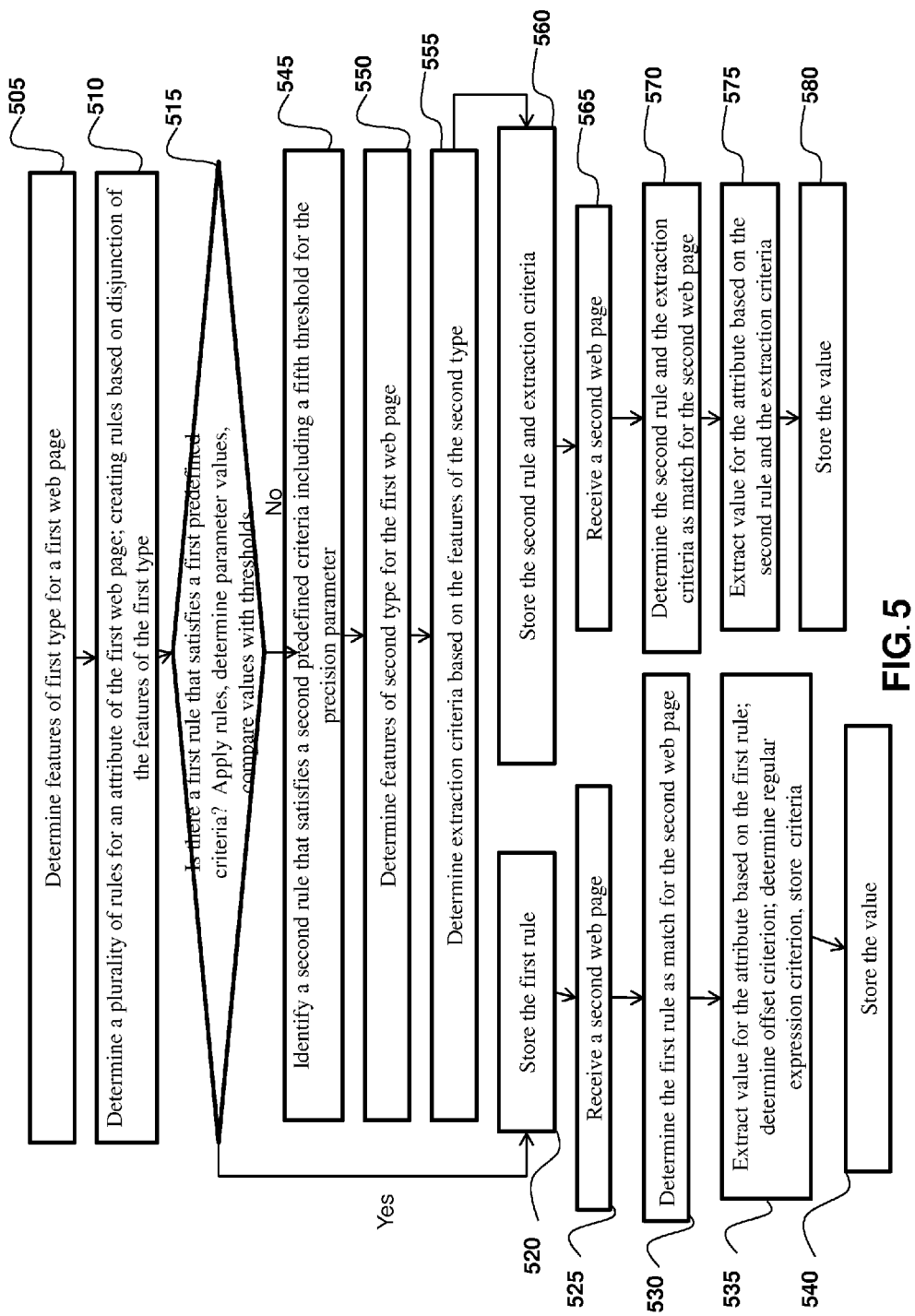
FIG. 5A, FIG. 5B, and FIG. 5C are flowcharts illustrating a method for web information extraction, in accordance with an embodiment.

In some embodiments, such as that shown in FIG. 5 at the element 515, identifying the first rule includes applying the plurality of rules on the plurality of web pages, determining values for at least one of the precision parameter, the support parameter, the distance parameter, and the recall parameter for each rule of the plurality of rules and comparing values for at least one of the precision parameter, the support parameter, the distance parameter and the recall parameter for each rule of the plurality of rules with respective thresholds.

If the first rule is determined at step 515, then step 520 is performed.

At step 520 the first rule is stored to enable extraction of value of the attribute from a second web page. It is noted that rules are determined for each attribute and stored.

At step 525, a second web page is received.

At step 530, the first rule is determined as a match for the second web page.

At step 535, the value of the attribute based on the first rule is extracted. In accordance with the embodiment of FIG. 5, for instance, the first rule can also include the offset criteria and the regular expression criteria. At step 540, the value of the attribute is stored.

In some embodiment, if no rule satisfying the first predefined criteria is identified at step 515 then a second rule satisfying the second predefined criteria is identified at step 545.

In some embodiments, such as that shown in FIG. 5 at the element 545, the second predefined criteria include a fifth threshold for the precision parameter.

At step 550, features of the second type are determined for the first web page of the plurality of web pages. In some embodiments, step 550 can be performed along with step 505.

At step 555, extraction criteria are determined based on features of the second type.

At step 560, the second rule and the extraction criteria are stored to enable extraction of the value of the attribute from the second web page.

At step 565, the second web page is received.

At step 570, the second rule and the extraction criteria are determined as a match for the second web page.

At step 575, the value of the attribute is extracted based on the second rule and the extraction criteria. The second rule can also include the offset criteria and the regular expression criteria.

At step 580, the value of the attribute is stored to render the value of the attribute when desired.

Figure 6:
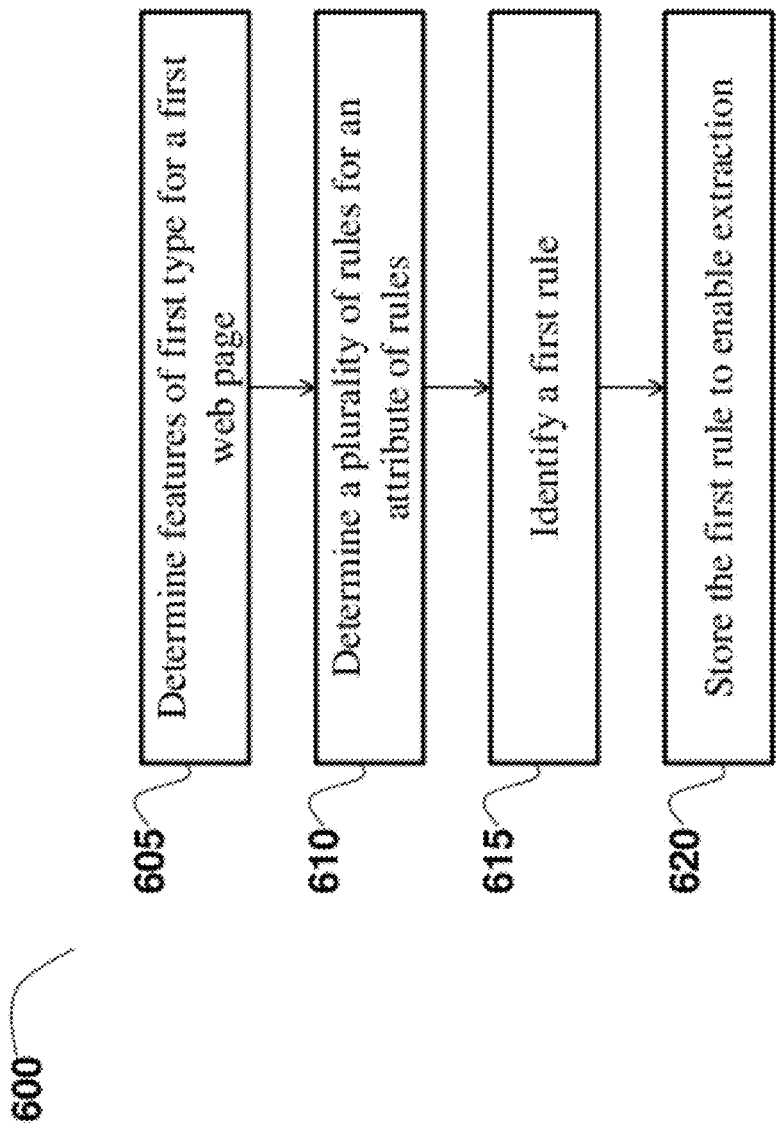
FIG. 6 is a flowchart illustrating a method for creating rules, in accordance with one embodiment.

FIG. 6 is a flowchart illustrating a method 600 for creating rules.

At step 605, the features of the first type (strong features) are determined for the first web page.

The identification of features can be performed, for example using the technique described in U.S. patent application Ser. No. 12/344,076 entitled, "ROBUST WRAPPERS FOR WEB EXTRACTION" having publication number US20100162097, filed on Dec. 22, 2008 and assigned to Yahoo! Inc. which is incorporated herein by reference in its entirety.

At step 610, a plurality of rules for an attribute of the first web page are determined based on the features of the first type.

In some embodiments, determining the rules include creating rules based on disjunction of the features of the first type.

Each rule includes either an XPath expression if value of the attribute is included in one node or a plurality of XPath expressions if the value of the attribute is included in multiple nodes.

At step 615, a first rule that satisfies the predefined criteria from the rules is identified. The first predefined criteria include a first threshold for a precision parameter, a second threshold for a support parameter, a third threshold for a distance parameter and a fourth threshold for a recall parameter.

In some embodiments, identifying the first rule includes applying the plurality of rules on the plurality of web pages, determining values for at least one of the precision parameter, the support parameter, the distance parameter, and the recall parameter for each rule of the plurality of rules and comparing values for at least one of the precision parameter, the support parameter, the distance parameter and the recall parameter for each rule of the plurality of rules with respective thresholds.

At step 620 the first rule is stored to enable extraction of value of the attribute from a second web page. It is noted that rules are determined for each attribute and stored.

Figure 7:
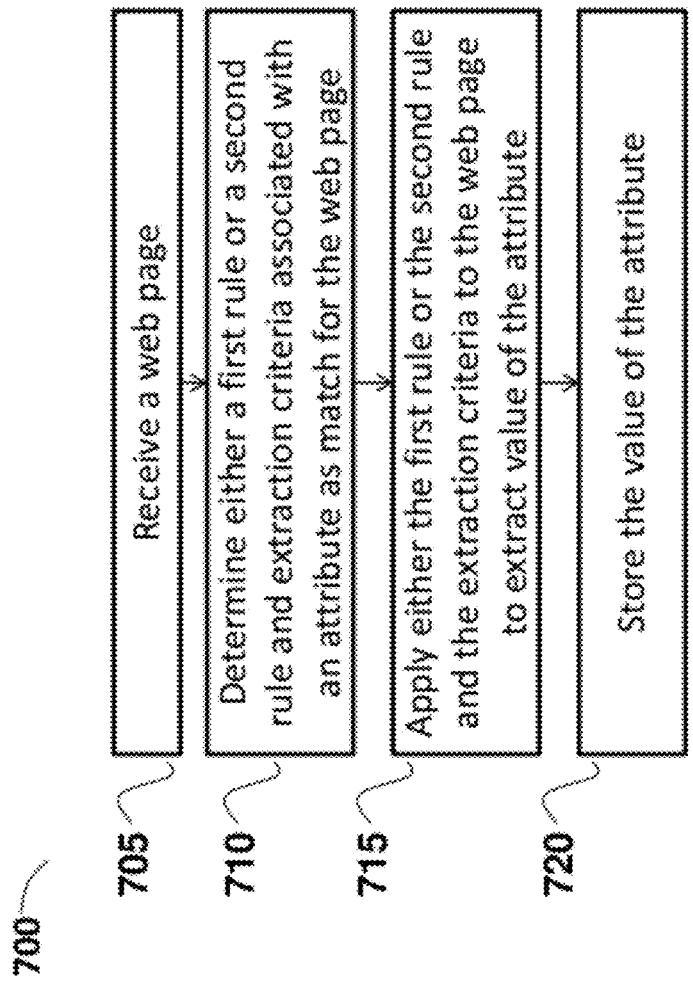
FIG. 7 is a flowchart illustrating a method for extraction using rules, in accordance with one embodiment.

FIG. 7 is a flowchart illustrating a method 700 for web extraction using rules, in accordance with one embodiment.

At step 705, a web page is received.

At step 710, either the first rule or the second rule and the extraction criteria associated with an attribute are determined as match for the web page.

At step 715, either the first rule or the second rule and the extraction criteria associated with the attribute are applied to the web page to extract the value of the attribute.

At step 720, the value of the attribute is stored to be accessed as and when desired. Values for various attributes are extracted and stored.

Figure 8:
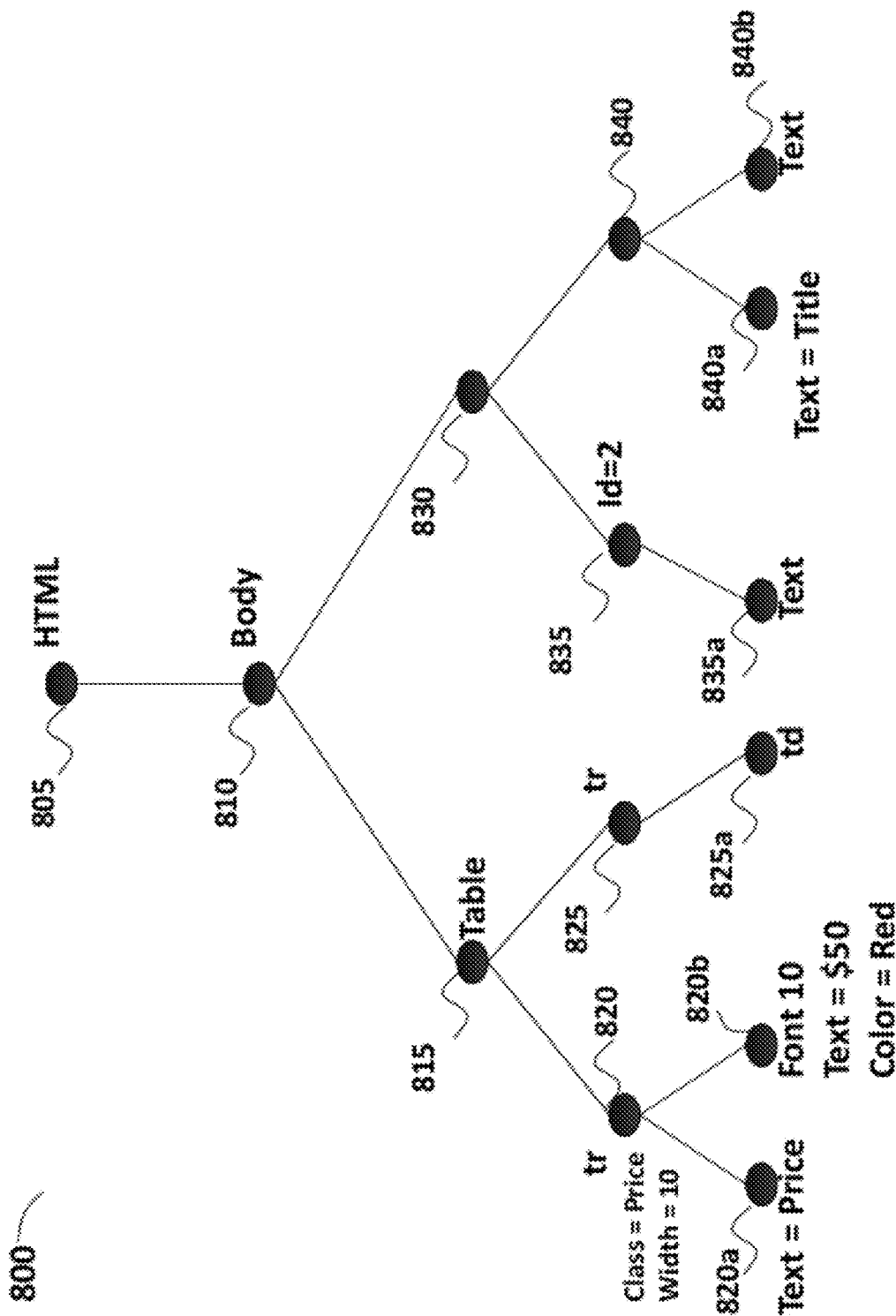
FIG. 8 is an exemplary illustration of generation of a rule for an attribute from a tree structure of a web page.

FIG. 8 is an exemplary illustration of generation of a rule for an attribute from a tree structure of a web page.

The present disclosure is explained using the first web page and one attribute as an example. FIG. 8 illustrates a tree structure of a web page 800. The tree structure includes a node 805, a node 810, a node 815, a node 820, a node 820a, a node 820b, a node 825, a node 825a, a node 830, a node 835, a node 835a, a node 840, a node 840a and a node 840b.

Each node is associated with features. The node 820b and the node 835 are annotated nodes having the features "class=price"; "width=10" and "Id=2" on the path from them till the root. The feature of interest is "class=price"; "width=10" and "Id=2".

A server, for example the server 105, receives the web page 800, the web page 800, as thus received, containing nodes annotated by the annotator. The server generates a rule and stores the rule during the learning phase.

Learning Phase

The features "class=price"; "width=10" and "Id=2" of the web page 800 are identified. The features are categorized as strong features (features of first type) and weak features (features of second type). The strong features include features that are not expected to change over time. The strong features of the web page 800 include "class=price" or "id=2" values and textual features.

The weak features are determined as features which can change frequently and are less robust in nature. The weak features of the web page 800 include font, "width=10" and "color=red".

XPaths are then generated for all the features of interest. The features for which the XPath is generated are tags, id and class.

For the node 815 tag is table and the annotated node of interest is the node 820b. The XPath is generated as follows:
//table/*/node( ).

As the node 820b is at a distance of two nodes from the node 815 the XPath includes a single *.

For the node 835 the XPath generated for id=2 which is at the node 835 itself, is as follows:
//[@id=2]node( ) or //[@ id]node( )

For the node 820 the XPath generated for class which is at the node 820 is as follows:
//*[@class=Price]/node( ) or //*[@class]/node( )

The server first generates a single level feature for each feature.

In some embodiments, level two features are generated using a combination of two level one features. For example, for the node 820b, when two level one features (//tr/node( ), //*[class=Price])/node ( ) are joined, the resultant level two feature is //tr[@class=Price]/node ( ).)

A feature and rule generator, for example the features and rule generator 310, determines the node 820b and the annotated node 835, and determines the feature associated with the node 820b and the annotated node 835. Hence, the feature and rule generator generates XPaths for class, id, and preceding or following texts (only strong features).

For the node 815 one feature is //table, where // is a command to match the feature anywhere in the web page. The feature and rule generator determines the distance of the node 815 from the node 820b and hence the XPath is //table/*/node( ) where single * denotes two node distance.

The feature and rule generator generates single level features and feed it to a generalization unit, for example the generalization unit 315.

The generalization unit receives all the features, and rules corresponding to the annotated attribute. The generalization unit then checks the rules against the first predefined criteria to determine the first rule satisfying the first predefined criteria. If no such rule exists then the generalization unit checks for a combination of first and the second level features and so on till all the levels are exhausted. Finally if no rule satisfying the first predefined criteria is found, it sends the rules to classifier framework, for example the classifier framework 320 to identify the second rule satisfying the second predefined criteria and to identify the extraction criteria. The checking is done by applying rule to the web pages.

The classifier framework uses all the weak features of the web page 800 "Width=10", "Font=10" and "Color=Red" to reduce the noise. The classifier framework generates scores for each node of the web page 800 by using the XPath combined with all the weak features. The score is a total number of features associated with the node and number of times the feature appears in the web page 800. For a new page, a set of candidate nodes is generated using the second predefined criteria. Each of these candidate nodes are then given a score which is the sum of scores of all the features associated with the candidate node.]

The classifier framework determines the highest positive score and saves the XPath and the node with respect to the highest positive score.

The first rule or the second rule and the extraction criteria are then stored. In addition, the rules can also include the offset criteria and the REGEX criteria.

Extraction Phase

A match system, for example the match system 405, receives the web page 800 and determines the website of the web page 800. The match system determines a rule to be applied on the web page 800.

Web page 800 is crawled. The matching rule is determined as:

Path is //table/*/node( ), However the path is not included because of precision !=1)

//[@id=2]node( ) or //[@id]node( ); and

//*[@class=Price]/node( ) or //*[@class]/node( )

and is applied to extract the data from the web page 800.

Figure 9:
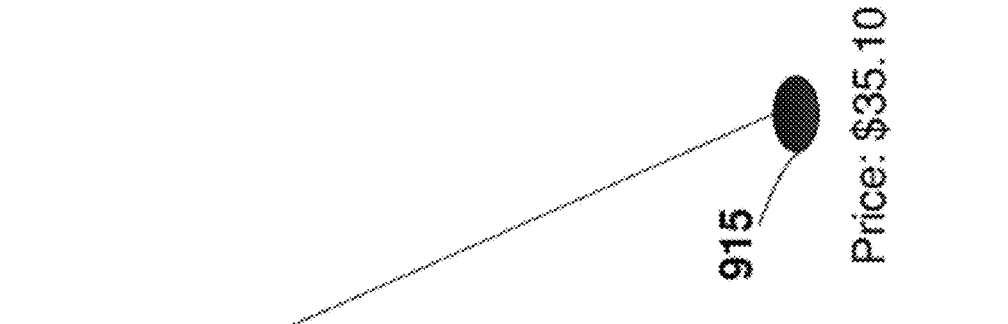
FIG. 9 is another exemplary illustration of generation of a rule for an attribute from a tree structure of a web page.
Figure 9:
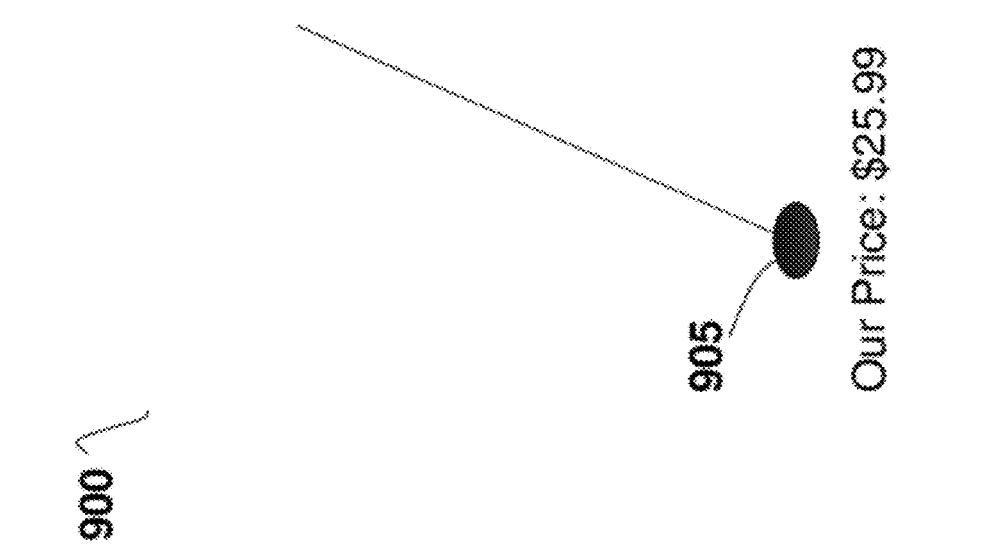

FIG. 9 is an exemplary illustration of generation of a rule for an attribute from a tree structure of a web page.

FIG. 9 illustrates a tree structure of a web page 900 and a second web page 910. The tree structure of the first web page 900 includes a node 905 and the tree structure of the second web page includes a node 915.

The node 905 text contains "Our Price: $25.99", the required output is "$25.99". Range pruner is a component that selects the text of interest from a node or a pair of nodes. It learns the required range information (in our example, third or last word) and extracts the text of interest from a given node.

When the text of interest is not the complete text of a leaf node, but only a part of it, the range-pruner module learns consistent word level range across annotated pages. This range information is captured in terms of a Start Offset (SO) and an End Offset (EO). Learning an offset is done either from the beginning or the end of the node text for both SO and EO. Offsets with respect to the end of the node text are indicated by negative numbers. Finally the text that is consistent across all annotated is picked.

Hence here, the text of interest for price attribute is "$25.99" at the node 905 from text "Our Price: $25.99" at the node 905 in the web page 900 and "$35.10" at the node 915 from text "Price: $35.10" at the node 915 in the secondweb page 910. Hence, the range information for the text of interest is varying from the beginning of the node text (i.e. 3rd word in the web page 900 and second word in the secondweb page 910), but consistent from the end of the node text (i.e. last word in both pages). So, the range pruner learns range information: SO=−1 and EO=−1, indicating the last word of node text as the text of interest.

FIG. 10 is an exemplary illustration of generation of a rule for an attribute property from a tree structure of a web page.

FIG. 10 illustrates a tree structure of a web page 1000. The tree structure of the web page 1000 includes a start node 1005 and an end node 1010.

When the text of interest spans multiple nodes, the start node and the end node containing the text of interest are identified and XSLT rule (with partial-node range information, if any) is learnt for both the nodes independently. The range-pruner module extracts the text between these two nodes only if both the nodes are identified with the enough confidence and the start node occurs logically before the end node in the DOM tree. The range pruner module first outputs the start node text (with partial-node selection, if required), the text between the start and the end node, and the end node text (again, with partial-node selection, if required).

In the web page 1000, the selected text of interest for "address" attribute span across nodes. The start node 1005 (td/i/text( )) and the end node 1015 (td/font/text( )) containing the selected text of interest are indentified and the XSLT rule is learnt independently for both of the start node 1005 and the end node 1010. The range pruner learns range information for the start node as: SO=2 and EO=4 and for the end node as: SO=1 and EO=2. The text of interest is extracted based on the start and the end node range learning and the text between them.

In some embodiments, regex criteria are used for selecting values of "typed" attributes like price (currency+number), phone number, zip code, etc. The regex criteria are created and are associated with the corresponding typed attributes. The regex criteria both select and validate the attribute values in the presence of surrounding text.

FIG. 11 is a block diagram of a server, in accordance with one embodiment.

FIG. 11 is a block diagram of a server 105, in accordance with one embodiment. The server 105 includes a bus 1105 for communicating information, and a processor 1110 coupled with the bus 1105 for processing information. The server 105 also includes a memory 1115, for example a random access memory (RAM) coupled to the bus 1105 for storing instructions to be executed by the processor 1110. The memory 1115 can be used for storing temporary information required by the processor 1110. The server 105 may further include a read only memory (ROM) 1120 coupled to the bus 1105 for storing static information and instructions for the processor 1110. A server storage device 1125, for example a magnetic disk, hard disk or optical disk, can be provided and coupled to the bus 1105 for storing information and instructions.

The server 105 can be coupled via the bus 1105 to a display 1130, for example a cathode ray tube (CRT) or a liquid crystal display (LCD), for displaying information. An input device 1135, for example a keyboard, is coupled to the bus 1105 for communicating information and command selections to the processor 1110. In some embodiments, cursor control 1140, for example a mouse, a trackball, a joystick, or cursor direction keys for command selections to the processor 1110 and for controlling cursor movement on the display 1130 can also be present.

In one embodiment, the steps of the present disclosure are performed by the server 105 in response to the processor 1110 executing instructions included in the memory 1115. The instructions can be read into the memory 1115 from a machine-readable medium, for example the server storage device 1125. In alternative embodiments, hard-wired circuitry can be used in place of or in combination with software instructions to implement various embodiments.

The term machine-readable medium can be defined as a medium providing content to a machine to enable the machine to perform a specific function. The machine-readable medium can be a storage media. Storage media can include non-volatile media and volatile media. The server storage device 1125 can be non-volatile media. The memory 1115 can be a volatile medium. All such media must be tangible to enable the instructions carried by the media to be detected by a physical mechanism that reads the instructions into the machine.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

The machine readable medium can also include online links, download links, and installation links providing the instructions to be executed by the processor 1110.

The server 105 also includes a communication interface 1145 coupled to the bus 1105 for enabling communication. Examples of the communication interface 1145 include, but are not limited to, an integrated services digital network (ISDN) card, a modem, a local area network (LAN) card, an infrared port, a Bluetooth port, a zigbee port, and a wireless port.

The server 105 is also connected to a storage device 130 that stores attribute properties that are static across the plurality of web pages and the robust XPaths.

In some embodiments, the processor 1110 can include one or more processing devices for performing one or more functions of the processor 1110. The processing devices are hardware circuitry performing specified functions.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. A method comprising:
    determining features of a first type and features of a second type for a first web page of a plurality of web pages;
    electronically determining a plurality of rules for an attribute of the first web page, wherein the plurality of rules are determined based on the features of the first type, the electronically determining including processing the first web page to learn rules for extracting values of attributes from incoming web pages, the processing including annotating entities on the first web page and associating annotated entities with nodes;
    electronically identifying a first rule, from the plurality of rules, which satisfies a first predefined criteria, the first predefined criteria comprising:
        a first threshold for a support parameter, and
        a second threshold for a distance parameter; and
    storing the first rule to enable extraction of value of the attribute from a second web page;
    wherein the features of the first type are strong features and the features of the second type are weak features, wherein the weak features can change frequently and are less robust in nature than the strong features;
    further wherein electronically identifying the first rule comprises:
        applying the plurality of rules on the plurality of web pages; and
        determining values for the support parameter which is a fraction of a number of unannotated pages in which one or more candidates to a total number of unannotated pages are selected, and for the distance parameter which is a measured maximum distance of features, for each rule of the plurality of rules; and
        comparing values for the support parameter, and the distance parameter for each rule of the plurality of rules with respective thresholds.

2. The method as claimed in claim 1 and further comprising:
    receiving the second web page;
    determining the first rule as a match for the second web page;
    extracting value of the attribute based on the first rule; and
    storing the value of the attribute to render the value of the attribute when desired.

3. The method as claimed in claim 1 and further comprising:
    if none of the plurality of rules satisfy the first predefined criteria then
    electronically identifying a second rule, from the plurality of rules, which satisfies a second predefined criteria, the second predefined criteria comprising a third threshold for a precision parameter;
    determining the features of the second type for the first web page of the plurality of web pages;
    determining an extraction criteria based on the features of the second type; and
    storing the second rule and the extraction criteria to enable extraction of the value of the attribute from the second web page.

4. The method as claimed in claim 3 and further comprising:
    receiving the second web page;
    determining the second rule and the extraction criteria as a match for the second web page;
    extracting value of the attribute based on the second rule and the extraction criteria; and
    storing the value of the attribute to render the value of the attribute when desired.

5. The method as claimed in claim 1 and further comprising:
    determining an offset criteria for the attribute; and
    storing the offset criteria to enable extraction;
    wherein the offset criteria is a range pruner criteria which includes learning word level range information and picking text that is consistent across annotated examples, and outputs start node text, text between a start node and an end node, and end node text.

6. The method as claimed in claim 1 and further comprising:
    determining a regular expression criteria for the attribute; and
    storing the regular expression criteria.

7. The method as claimed in claim 1, wherein electronically determining the plurality of rules comprises:

creating rules based on disjunction of the features of the first type.

8. The method as claimed in claim 1, wherein each rule of the plurality of rules comprises an XPath expression if value of the attribute is comprised in one node; and
a plurality of XPath expressions if the value of the attribute is comprised in multiple nodes.

9. An article of manufacture comprising:
a non-transitory machine readable medium; and
instructions carried by the non-transitory machine readable medium and operable to cause a programmable processor to perform:
determining features of a first type and features of a second type for a first web page of a plurality of web pages;
determining a plurality of rules for an attribute of the first web page, wherein the plurality of rules are determined based on the features of the first type, the electronically determining including processing the first web page to learn rules for extracting values of attributes from incoming web pages, the processing including annotating entities on the first web page and associating annotated entities with nodes;
identifying a first rule, from the plurality of rules, which satisfies a first predefined criteria, the first predefined criteria comprising:
a first threshold for a support parameter, and
a second threshold for a distance parameter;
storing the first rule to enable extraction of value of the attribute from a second web page;
determining an offset criteria for the attribute; and
storing the offset criteria to enable extraction;
wherein the offset criteria is a range pruner criteria which includes learning word level range information and picking text that is consistent across annotated examples, and outputs start node text, text between a start node and an end node, and end node text;
wherein the features of the first type are strong features and the features of the second type are weak features, wherein the weak features can change frequently and are less robust in nature than the strong features.

10. The article of manufacture as claimed in claim 9 and further comprising instructions operable to cause the programmable processor to perform:
receiving the second web page;
determining the first rule as a match for the second web page;
extracting value of the attribute based on the first rule; and
storing the value of the attribute to render the value of the attribute when desired.

11. The article of manufacture as claimed in claim 9 and further comprising:
if none of the plurality of rules satisfy the first predefined criteria then
identifying a second rule, from the plurality of rules, which satisfies a second predefined criteria, the second predefined criteria comprising a third threshold for a precision parameter;
determining the features of the second type for the first web page of the plurality of web pages;
determining an extraction criteria based on the features of the second type; and
storing the second rule and the extraction criteria to enable extraction of the value of the attribute from the second web page.

12. The article of manufacture as claimed in claim 11 and further comprising instructions operable to cause the programmable processor to perform:
receiving the second web page;
determining the second rule and the extraction criteria as a match for the second web page;
extracting value of the attribute based on the second rule and the extraction criteria; and
storing the value of the attribute to render the value of the attribute when desired.

13. The article of manufacture as claimed in claim 9 and further comprising instructions operable to cause the programmable processor to perform:
determining a regular expression criteria for the attribute; and
storing the regular expression criteria.

14. The article of manufacture as claimed in claim 9, wherein determining the plurality of rules comprises:
creating rules based on disjunction of the features of the first type.

15. The article of manufacture as claimed in claim 9, wherein each rule of the plurality of rules comprises:
an XPath expression if value of the attribute is comprised in one node; and
a plurality of XPath expressions if the value of the attribute is comprised in multiple nodes.

16. The article of manufacture as claimed in claim 9, wherein identifying the first rule comprises:
applying the plurality of rules on the plurality of web pages;
determining values for the support parameter which is a fraction of a number of unannotated pages in which one or more candidates to a total number of unannotated pages are selected, and for the distance parameter which is a measured maximum distance of features, for each rule of the plurality of rules; and
comparing values for the support parameter, and the distance parameter for each rule of the plurality of rules with respective thresholds.

17. A computer-implemented system comprising:
a communication interface in communication with one or more web servers comprising multiple web pages, so as to receive and transmit information pertaining to the web pages between the system and the one or more web servers;
a non-transitory memory that stores instructions; and
a processor coupled to receive the instructions from the non-transitory memory, the processor operating responsive to the instructions to:
determine features of a first type and features of a second type for a first web page of a plurality of web pages;
determine a plurality of rules for an attribute of the first web page, wherein the plurality of rules are determined based on the features of the first type, the electronically determining including processing the first web page to learn rules for extracting values of attributes from incoming web pages, the processing including annotating entities on the first web page and associating annotated entities with nodes;
identify a first rule, from the plurality of rules, which satisfies a first predefined criteria, the first predefined criteria comprising:
a first threshold for a support parameter, and
a second threshold for a distance parameter; and
store the first rule to enable extraction of value of the attribute from a second web page;

further wherein electronically identifying the first rule comprises:
  applying the plurality of rules on the plurality of web pages; and
  determining values for the support parameter which is a fraction of a number of unannotated pages in which one or more candidates to a total number of unannotated pages are selected, and for the distance parameter which is a measured maximum distance of features, for each rule of the plurality of rules; and
  comparing values for the support parameter, and the distance parameter for each rule of the plurality of rules with respective thresholds.

18. The system as claimed in claim 17, wherein the processor is further responsive to the instructions to:
  receive the second web page;
  determine the first rule as a match for the second web page;
  extract value of the attribute based on the first rule; and
  store the value of the attribute to render the value of the attribute when desired.

19. The system as claimed in claim 17, wherein the processor is further responsive to the instructions, if none of the plurality of rules satisfy the first predefined criteria, to:
  identify a second rule, from the plurality of rules, which satisfies a second predefined criteria, the second predefined criteria comprising a third threshold for a precision parameter;
  determine the features of the second type for the first web page of the plurality of web pages;
  determine an extraction criteria based on the features of the second type; and
  store the second rule and the extraction criteria to enable extraction of the value of the attribute from the second web page.

20. The system as claimed in claim 19, wherein the processor is further responsive to the instructions to:
  receive the second web page;
  determine the second rule and the extraction criteria as a match for the second web page;
  extract value of the attribute based on the second rule and the extraction criteria; and
  store the value of the attribute to render the value of the attribute when desired.

* * * * *